United States Patent [19]
Kimura

[11] Patent Number: 5,239,374
[45] Date of Patent: Aug. 24, 1993

[54] ENDOSCOPE TV CAMERA APPARATUS
[75] Inventor: Kenji Kimura, Tachikawa, Japan
[73] Assignee: Olympus Optical Co., Ltd., Tokyo, Japan
[21] Appl. No.: 785,119
[22] Filed: Oct. 30, 1991
[30] Foreign Application Priority Data Dec. 21, 1990 [JP] Japan .................. 2-405223
Aug. 14, 1991 [JP] Japan .................. 3-204478

[51] Int. Cl.⁵ .................. H04N 7/18; H04N 9/4; H04N 9/64
[52] U.S. Cl. .................. 358/98; 358/29
[58] Field of Search .................. 358/41-44, 358/98, 29, 296, 28, 27, 25, 26, 22, 33, 34, 35, 36, 37, 166, 167, 174, 172, 171, 177

[56] References Cited
U.S. PATENT DOCUMENTS 4,638,350 1/1987 Kato et al. .................. 358/29 C
4,646,161 2/1987 Tsuchiya et al. .................. 358/29 C
4,883,360 11/1989 Kawada et al. .................. 358/29 C
4,951,134 8/1990 Nakasima et al. .................. 358/98
4,961,110 10/1990 Nakamura .................. 358/98

FOREIGN PATENT DOCUMENTS 58-166188 11/1983 Japan .
0100090 5/1986 Japan .

Primary Examiner—James J. Groody
Assistant Examiner—Michael H. Lee
Attorney, Agent, or Firm—Armstrong, Westerman, Hattori, McLeland & Naughton

[57] ABSTRACT

A three-plate type TV camera apparatus for endoscopes which can be removably fitted to an endoscope eyepiece part, wherein an object image is imaged as divided in three primary colors and comprises an amplifying circuit amplifying a signal superimposed with a reference signal, a signal processing circuit processing an amplified signal and a gain controlling circuit controlling the gain of the amplifying circuit in response to the difference between the reference signal component included in the output of each signal processing circuit and the objective reference level.

11 Claims, 6 Drawing Sheets

FIG. 3
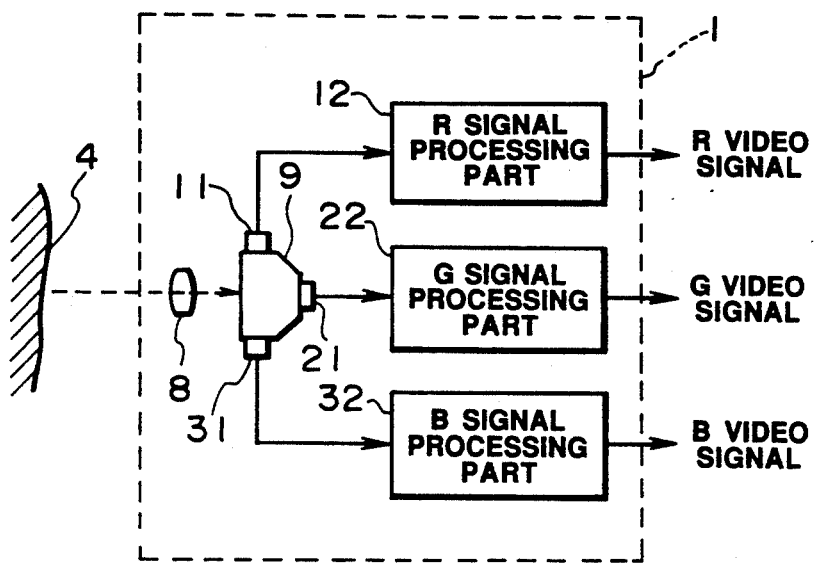
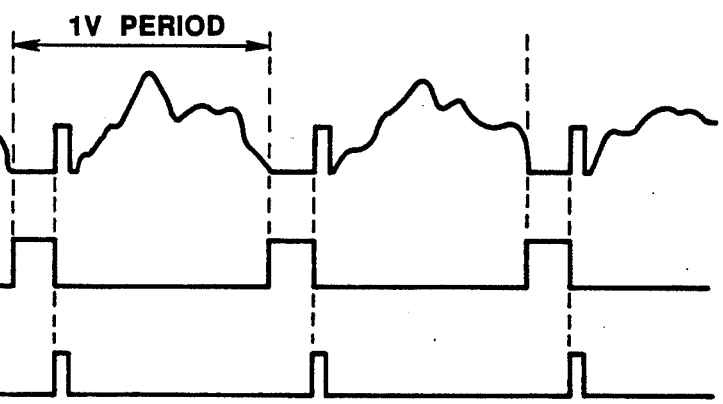
FIG. 4(a) VIDEO SIGNAL 51
FIG. 4(b) VERTICAL BLANKING SIGNAL 52
FIG. 4(c) PILOT SIGNAL 41

VIDEO SIGNAL 114

TIMING PULSE 116

ENDOSCOPE TV CAMERA APPARATUS

BACKGROUND OF THE INVENTION

1. Field of the Invention:

This invention relates to an endoscope TV camera apparatus provided with an automatic gain controlling means for automatically controlling a characteristic difference between respective divided image signal processing circuits.

2. Description of the Related Art:

An endoscope apparatus for displaying an image of an object by connecting a TV camera to an eyepiece part of an endoscope (such as a fiber scope) is well-know. In the case of a fiber scope, such TV camera is used for imaging an optical image of an object transmitted to an eyepiece part through an image guide fiber within the scope.

In an endoscope apparatus of the above mentioned TV camera wherein a color image is simultaneously imaged by radiating a white radiating light to an object, a three-plate type TV camera is generally used. In such three-plate type TV camera, a three-color analyzing prism (dichroic prism) is provided in the rear of an imaging lens, a white radiating light is divided into three color lights of primary colors of R, G and B and the respective color lights are imaged by separate solid state imaging devices. With such three-plate type TV camera, the respective color signals can be independently processed and the colors can be also independently corrected so that a color image of an object having good tone and high resolution may be obtained.

However, with a conventional three-plate type TV camera, it has heretofore been impossible to automatically control a gain adjustment in gain controlling amplifiers (abbreviated as GCA's hereinafter) for amplifying respective divided signals and inputting them into signal processing circuits, because it is necessary to provide respective automatic gain controlling means (abbreviated as AGC means hereinafter) for the GCA's for the respective color signals and therefore it is difficult to uniformly control the respective GCA's by the AGC means.

In the above mentioned GCA and signal processing circuit, generally a dispersion will be produced between the respective circuits and a characteristic difference will be generated between the respective signals. Also, a characteristic difference will be generated by a variation in the lapse of time. Therefore, there will occur such problems that the correlation of respective color signal levels will collapse and particularly the color reproducing characteristic will deteriorate.

SUMMARY OF THE INVENTION

An object of the present invention is to provide an endoscope TV camera apparatus wherein a characteristic difference between respective divided image signal processing circuits can be automatically controlled and the correlation of respective color signal levels can be controlled so that the color reproducing characteristic may be improved.

Another object of the present invention is to provide an endoscope TV camera apparatus wherein, even when a plurality of gain controlling circuits are provided, the dispersion of the characteristics of the respective gain controlling circuits will be able to be corrected to coincide with a reference circuit characteristic, the characteristic difference between respective signal processing circuits will be able to be corrected to control the gain of the GCA and the video signals of the respective colors will be able to be controlled on a constant level.

Further, another object of the present invention is to provide an endoscope TV camera apparatus wherein an AGC function can be realized in a three-plate type TV camera externally fitted to an endoscope in which it has been difficult, particularly the spectral characteristic dispersion of an optical prism and the characteristic dispersion among a plurality of solid state imaging devices can be corrected and the gain of the CGA's can be controlled so that the video signals of the respective colors may be on a constant level and an AGC function high in the precision may be provided.

The TV camera apparatus of the present invention can be removably fitted to the eyepiece part of an endoscope, and is of a three-plate type imaging an object image as divided into three primary colors. The TV camera comprises a reference signal superimposing means superimposing a reference signal on respective divided color signals, an amplifying means ampligying the signals on which the above mentioned reference signal is superimposed, a signal processing means processing the above mentioned amplified signals and a gain controlling means controlling the gain of the above mentioned amplifying means in response to the difference between the above mentioned reference signal component included in the output of the above mentioned respective signal processing means and the objective reference level.

The other features and advantages of the present invention will become apparent enough with the following explanation.

BRIEF DESCRIPTION OF THE DRAWINGS

FIGS. 1 to 5 relate to the first embodiment of the present invention.

FIG. 1 is a formation diagram of a signal processing part of a TV camera apparatus.

FIG. 2 is a formation explaining view of an endoscope apparatus.

FIG. 3 is a formation explaining diagram of an imaging part and signal processing part of a TV camera apparatus.

FIGS. 4a-4b are explanatory diagrams of a video signal and reference signal in a TV camera apparatus.

FIG. 5 is a formation explaining diagram of a sample holding circuit in a TV camera apparatus.

FIGS. 6 to 8 relate to the second embodiment of the present invention.

FIG. 6 is a formation explaining diagram of an imaging part and signal processing part of a TV camera apparatus.

FIG. 7 is a formation diagram of a signal processing part of a TV camera apparatus.

DETAILED DESCRIPTION OF THE PREFERRED EMBODIMENTS

The first embodiment is shown in FIGS. 1-5 of the present invention.

Figure 2:
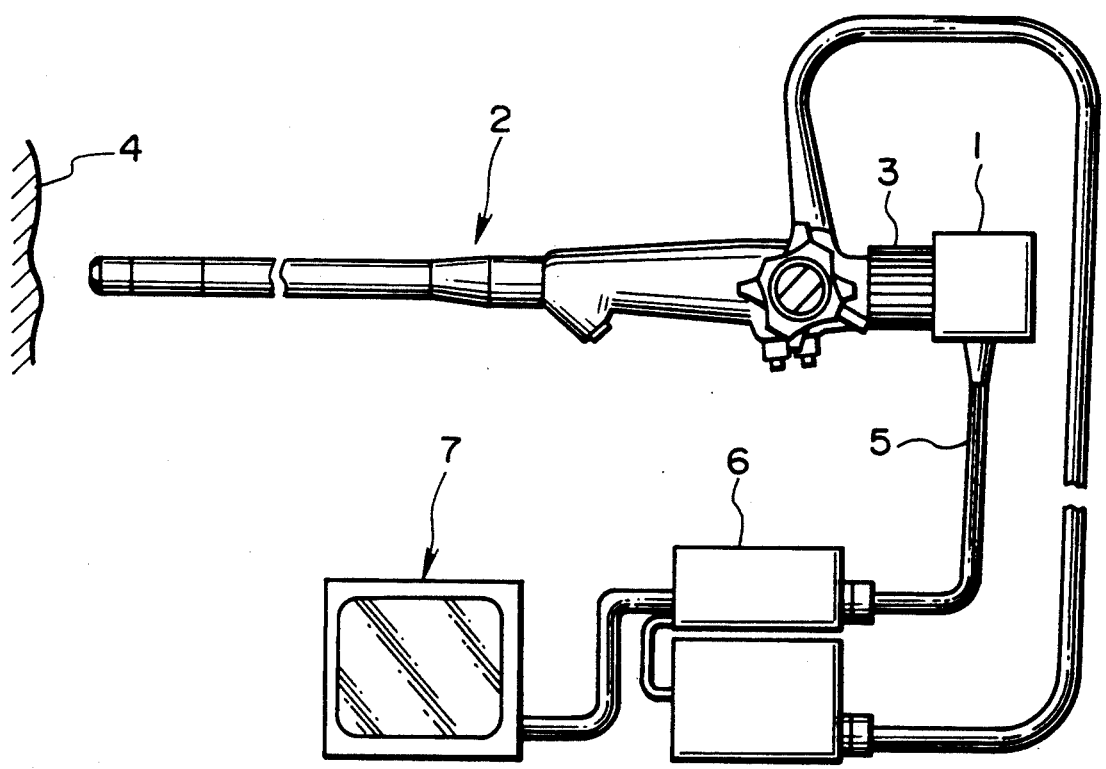

The TV camera apparatus according to the present invention is used for endoscope apparatus as is shown, for example, in FIG. 2. A TV camera apparatus 1 is removably connected to an eyepiece part 3 of an endoscope 2 so that an image of an object 4 transmitted through the endoscope 2 may be imaged from the eyepiece part 3. Also, the above mentioned TV camera 1 is connected to an image processing apparatus 6 through a cable 5 so that a signal processed to be an image in this image processing apparatus 6 may be displayed in a monitor 7 or the like as an object image.

In the imaging part of the above mentioned TV camera apparatus, as shown in FIG. 3, an optical lens 8 and dichroic prism 9 are provided so that the object image of the object 4 having passed through the optical lens 8 may be divided into the respective lights of R, G and B by the dichroic prism 9 and the object images of the respective divided colors may be formed on the imaging surfaces of such solid state imaging devices 11, 21 and 31 as respective CCD's. The above mentioned respective solid state imaging devies 11, 21 and 31 are connected respectively to signal processing parts 12, 22 and 32 respectively for R, B and G so that the imaged respective color signals may be processed to be converted to video signals respectively of R, G and B.

Figure 1:
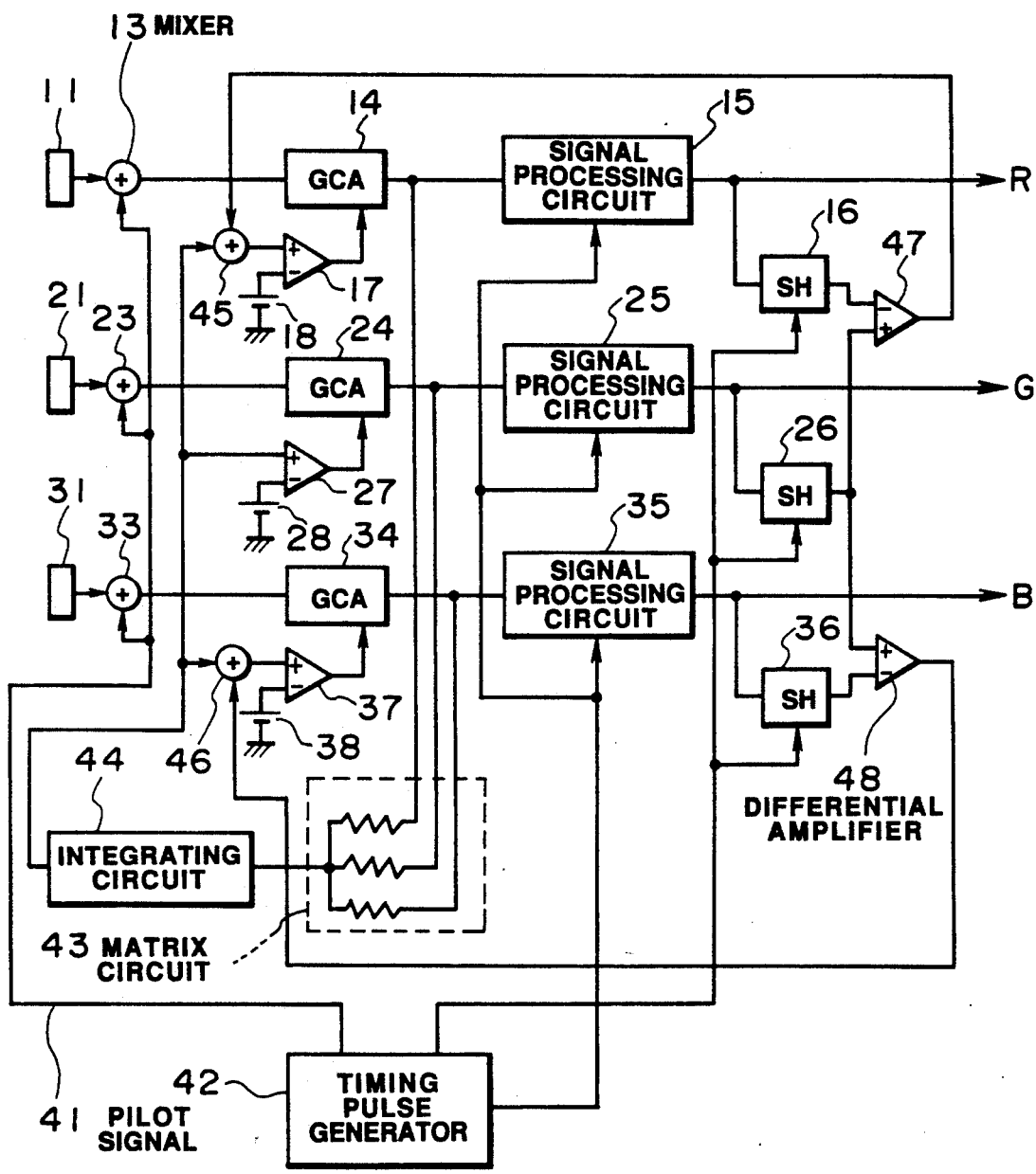

The above mentioned respective signal processing parts 12, 22 and 32 are formed as shown in FIG. 1. The outputs of the respective color solid state imaging devices 11, 21 and 31 are fed respectively to mixers 13, 23 and 33, respectively, as reference signal superimposing means, have a pilot signal 41 as a reference signal superimposed on them and are input into GCA's 14, 24 and 34 as amplifying means. The outputs of the above mentioned GCA's 14, 24 and 34 are input respectively into signal processing circuits 15, 25 and 35 as signal processing means. The signals processed here are output as R, G and B video signals.

The above mentioned mixers 13, 23 and 33 are connected to a timing pulse generator 42 so that the pilot signal 41 produced by this timing pulse generator 42 may be superimposed in the mixers 13, 23 and 33. The above mentioned timing generator 42 is connected also to the respective signal processing circuits 15, 25 and 35 so that the signal processing timing or the like may be controlled and is connected also to sample holding circuits (SH's) 16, 26 and 36 so that a sample holding timing may be taken by a timing pulse coinciding in the timing with the above mentioned pilot signal 41.

The above mentioned GCA's 14, 24 and 34 are connected at the output ends also to a matrix circuit 43 so that a luminance signal for controlling the gains of the respective GCA's 14, 24 and 34 may be produced by the matrix circuit 43. The output of the above mentioned matrix circuit 43 is fed to an integrating circuit 44 so that the above mentioned luminance signal may be integrated to calculate the average value.

Differential amplifiers 17, 27 and 37 are connected at the output ends, respectively, to the GCA's 14, 24 and 34 so that the gains of the respective GCA's 14, 24 and 34 may be controlled by these outputs. The output of the above mentioned integrating circuit 44 is fed to an R differential amplifier 17 and B differential amplifier 37 at the positive polar input ends respectively through mixers 45 and 46. The output of the above mentioned integrating circuit 44 is fed directly to the G differential amplifier 27 at the positive polar input end. Further, reference voltage sources 18, 28 and 38 are fed, respectively, to these differential amplifiers 17, 27 and 37 at the negative polar input ends.

The outputs of the above mentioned signal processing circuits 15, 25 and 35 are fed also respectively to the sample holding circuits (SH'sO 16, 26 and 36 in which the outputs of the signal processing circuits 15, 25 and 35 are respectively held. As shown, for example, in FIG. 5, the sample holding circuit 16, 26 or 36 is formed of an FET 49 used an analog switch and a sample holding condenser 50 holding a potential, so that the FET 49 may be turned on by a timing pulse 41b coinciding in the timing with the above mentioned pilot signal 41 and, in this period when it is on, the outputs of the signal processing circuits 15, 25 and 35 will be held by the sample holding condenser 50.

The outputs of the R sample holding circuit 16 and B sample holding circuit 36 are fed respectively to differential amplifiers 47 and 48 at the negative polar input ends. The output of the G sample holding circuit 26 is fed as a reference level signal to the above mentioned differential amplifiers 47 and 48 at the positive polar input ends. The outputs of the differential amplifiers 47 and 48 are fed respectively to mixers 45 and 46 and are superimposed on the average value of the above mentioned luminance signal so that the gains of the GCA's 14 and 34 may be controlled by these outputs. Here, the differential amplifiers 47 and 48 have gains substantially approximating infinity. Also, in the differential amplifiers 47 and 48, a negative feedback loop is formed.

As a gain controlling means controlling the gain of the above mentioned GCA, a negative feedback loop is formed of the matrix circuit 43, integrating circuit 44, mixers 45 and 46, differential amplifiers 17, 27 and 37, reference voltage sources 18, 28 and 38, sample holding circuits 16, 26 and 36 and differential amplifiers 47 and 48.

The operation of this embodiment shall be explained in the following.

In this embodiment, a pilot signal is superimposed on respective color signals imaged by solid state imaging devices, the level of the above mentioned pilot signal component within the respective processed signals is held, the level differences of the pilot signal component of the R and B signals are respectively detected with the G signal as a reference and the gain of the GCA is automatically controlled by feeding back this level difference.

The respective color signals received by the solid state imaging devices 11, 21 and 31 are superimposed with the pilot signal 41 respectively in the mixers 13, 23 and 33. This pilot signal 41 is set to that the level may be, for example, about ½ the saturated level of the output signal of the above mentioned solid state imaging device. The signals superimposed with the pilot signal 41 are amplified, respectively, by the GCA's 14, 24 and 34, are processed, respectively, by the signal processing circuits 15, 25 and 35 and are output respectively as R, G and B video signals.

The above mentioned video signal and pilot signal are as shown, for example, in FIGS. 4a–4b. The video signal 51 is superimposed with the component of the pilot signal 41 at intervals of one vertical period (1V period). The timing of superimposing this pilot signal 41 may be a period when a vertical blanking signal 52 is being output or just after the vertical blanking signal 52 falls.

Figure 5:
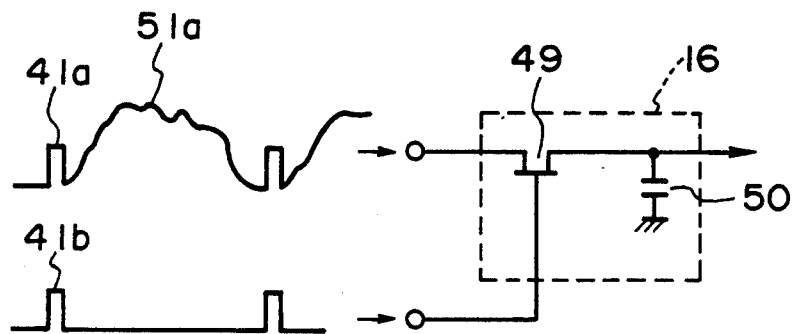

The respective video signals are held at a timing coinciding with that of the above mentioned pilot signal 41 by the respective sample holding circuits 16, 26 and 36. As shown in FIG. 5, at the timing of the timing pulse 41b, the level of the pilot signal component 41a of the video signal 51a is held by the sample holding circuit 16. The output of the G sample holding circuit 26 becomes a reference potential of the differential amplifiers 47 and 48. The outputs of the R and G sample holding circuits 16 and 36 are innput, respectively, into the differential amplifiers 47 and 48 and the level difference for the pilot signal component of the G video signal is calculated and is input into the mixers 45 and 46.

A luminance signal for controlling the gain of the GCA is produced in the matrix circuit 43 and an average value is calculated in the integrating circuit 44 and is input as a gain controlling signal into the differential amplifiers 17, 27 and 37 at the positive polar input ends. Here, the reference voltage sources 18, 28 and 38 connected, respectively, to the differential amplifiers 17, 27 and 37 at the negative polar input ends become control target potentials. On the G signal, the output of the integrating circuit 44 is input directly into the differential amplifier 27 at the positive polar input end and the gain of the GCA 24 is automatically controlled so as to be substantially equal to the above mentioned control target potential. Thereby, the G video signal of a constant level is obtained irrespective of the light amount of the object.

Also, the R and B signals are superimposed respectively with the outputs of the above mentioned differential amplifiers 47 and 48 and the gain controlling signal respectively in the mixers 45 and 46 and are input, respectively, into the differential amplifiers 17 and 37 at the positive polar input ends and the gains of the GCA's 14 and 34 are automatically controlled. Here, as the above mentioned differential amplifiers 47 and 48 have gains substantially approximating infinity and form feedback loops, the positive and negative input end potentials are controlled so as to be substantially equal. That is, the respective output potentials of the sample holding circuits 16, 26 and 36 are controlled so as to be automatically of the same potential. Thereby, the gains of the GCA's 14 and 34 for the R and B signals are automatically controlled with the G signal as a reference and the respective color video signals are controlled on a constant level.

Thus, according to this embodiment, even in an apparatus provided with a plurality of gain controlling circuits, the dispersion of the characteristics of the respective gain controlling circuits can be corrected and their characteristics can be made to coincide with the reference circuit characteristics. Therefore, the characteristic differences of the respective signal processing circuits can be automatically corrected, the gain of the GCA can be controlled and the video signals of the respective colors can be controlled on a constant level so that an output image signal high in the color reproducing characteristic may be obtained.

Figure 6:
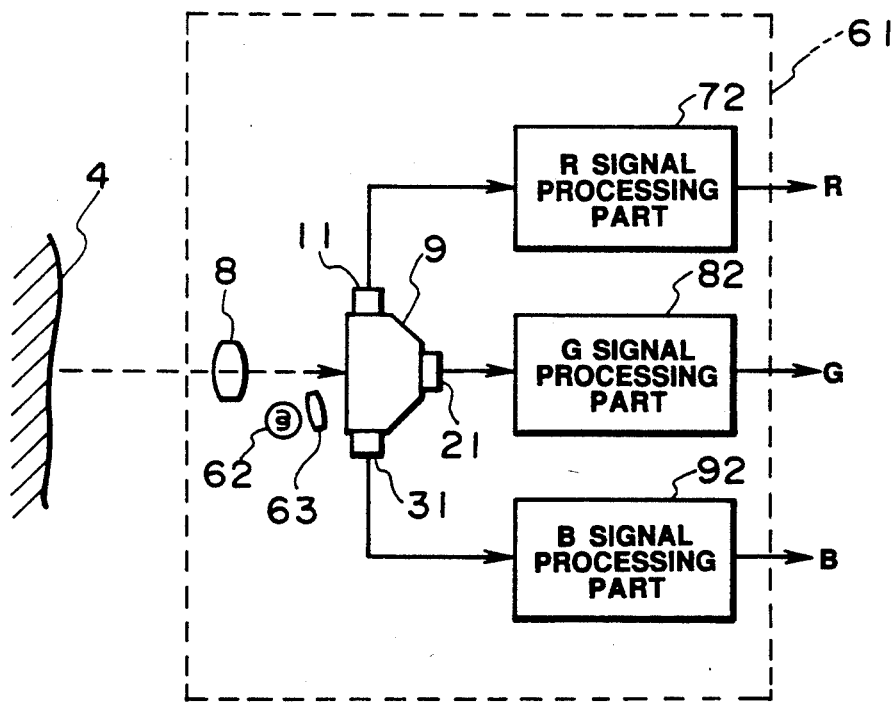
Figure 7:
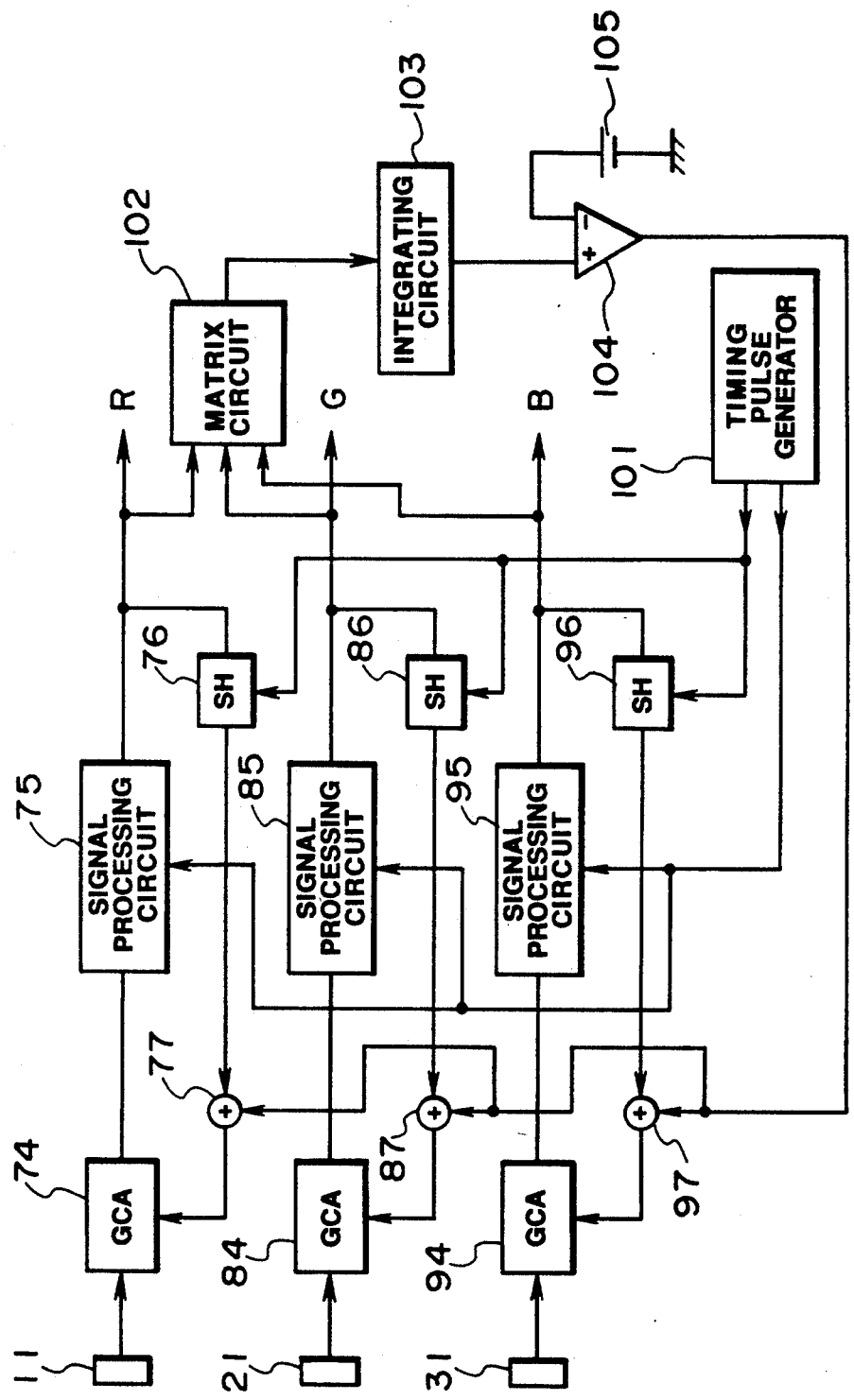
Figure 8A:
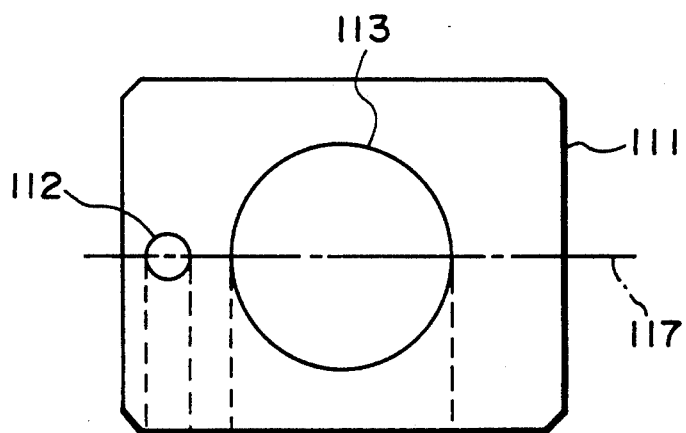
FIG. 8a-8c is an explantory diagrams of a video signal and timing pulse in the TV camera apparatus in FIG. 7.
Figure 8B:
Figure 8C:

In FIGS. 6 to 8 is shown the second embodiment of the present invention.

In the imaging part of a TV camera apparatus 61 of the second embodiment, as shown in FIG. 6, a white light lamp 62 is provided between the optical lens 8 and dichroic prism 9. This white light lamp 62 is arranged so that an emitted light bundle may be uniformly incident upon the three solid state imaging devices 11, 21 and 31 corresponding to the respective signals of R, G and B. An optical system 63 forming an image of the white light is arranged in front of the white light lamp 62.

By the way, for the the white light lamp 62, for example, a tungsten lamp is used but a white light source by an LED may be used.

Signal processing parts 72, 82 and 92 respectively for R, B and G are formed as shown in FIG. 7. The outputs of the respective color solid state imaging devices 11, 21 and 31 are fed respectively to GCA's 74, 84 and 94 which are connected respectively to signal processing circuits 75, 85 and 95 from which the processed signals are respectively output as R, G and B video signals.

The above mentioned signal processing circuits 75, 85 and 95 are connected at the output ends respectively also to sample holding circuits 76, 86 and 96 in which the outputs of the signal processing circuits 75, 85 and 95 are held. The output of the sample holding circuits 76, 86 and 96 are fed respectively to mixers 77, 87 and 97 which are connected at the output ends respectively to GCA's 74, 84 and 94 by whose outputs the gains of the respective GCA's 74, 84 and 94 are controlled.

A timing pulse generator 101 is connected to the above mentioned signal processing circuits 75, 85 and 95 so that the signal processing timing or the like may be controlled by the timing pulse generated here. Also, the timing pulse generator 101 is connected to the sample holding circuits 76, 86 and 96 so that the sample holding timing may be taken by the above mentioned timing pulse.

The signal processing circuits 75, 85 and 95 are connected at the output ends also to a matrix circuit 102 producing a luminance signal for controlling the gains of the respective GCA's 74, 84 and 94. The output of the matrix circuit 102 is fed to an integrating circuit 103 in which the above mentioned luminance signal is integrated and an average value is calculated. The output of the integrating circuit 103 is fed to a differential amplifier 104 at the positive input end. On the other hand, a reference voltage source 105 is fed to the differential amplifier 104 at the negative polar input end. The output of this differential amplifier 104 is superimposed respectively in the above mentioned mixers 77, 87 and 97 is fed to the GCA's 74, 84 and 94. A negative feedback loop is formed in the system formed of the above mentioned solid state imaging devices 11, 21 and 31, GCA's 74, 84 and 94, mixers 77, 87 and 97, differential amplifier 104, integrating circuit 103 and matrix circuit 102.

The operation of this embodiment shall be explained in the following.

In the first embodiment, the dispersion of the characteristics between the dichroic prism 9 and respective solid state imaging devices is not corrected. therefore, in this second embodiment, a white light is emitted from the front to the R, G and B analyzing prism, the photoelectrically converted and obtained signals by the above mentioned white light respectively in R, G and B are compared in the level and the dispersion among R, G and B of the solid state imaging devices and prism is corrected so that an AGC fucntion of a three-plate type camera high in the precision may be obtained.

In FIG. 8, numeral 111 represents a picture displayed in an observing monitor as obtained in case a general TV camera externally fitted to an endoscope and a fiber scope are combined. In this case, as the field angle of the fiber scope is substantially circular, on an observing monitor of an aspect ratio, for example, of 4:3, a region in which no picture is displayed will be always generated. Therefore, in this embodiment, a white light is imaged in the above mentioned region in which no picture is displayed, the dispersion degree of the characteristic is detected from the obtained signal of the white light and this dispersion is corrected.

In the displayed picture 111, as shown in FIG. 8(a), an image 112 by the above mentioned white light lamp 62 and an image 113 by the fiber scope are displayed. (b) shows a video signal 114 then and it is a signal corresponding to a scanning line 117 near the center. The reference numeral 115 represents a white light signal in the video signal 114. This level will be different respectively in R, G and B depending on the sensitivity dispersion of the solid state imaging device and the spectral characteristic of the dichroic prism 9 in case the signal is photoelectrically converted. By the way, the image 112 of the white light lamp may not be displayed on the monitor so as not be in the way of the observation.

The photoelectrically converted outputs of the solid state imaging devices 11, 21 and 31 are input respectively into the signal processing circuits 75, 85 and 95 respectively through the GCA's 74, 84 and 94. A horizontal synchronizing signal and vertical synchronizing signal required to process a video signal have been also input in the signal processing circuits 75, 85 and 95. The photoelectrically converted outputs of the solid state imaging devices 11, 21 and 31 are converted to standard video signals of RGB which are input into the observing monitor and are displayed.

The outputs of the above mentioned signal processing circuits 75, 85 and 95 are also input respectively into the sample holding circuit 76, 86 and 96 and are sample-held by the timing of the timing pulse fed from the timing pulse generator 42. Here, the waveform of the timing pulse is as shown in FIG. 8 (c). In the position where the timing pulse 116 and the photoelectrically converted white light signal 115 coincide with each other, the white light signal 115 is sample-held at a level 115a point. This sample-held voltage is input respectively into the gain controlling inputs of the GCA's 74, 84 and 94 respectively through the mixers 77, 97 and 97 and the gains are controlled.

The R, G and B video signals of the outputs of the signal processing circuits 75, 85 and 95 are input into the matrix circuit 102 where the luminance signal for controlling the gains of the GCA's is operated and output and is integrated in the integrating circuit 103 and the average value of the luminance signal is calculated. The average value information of the luminance signal obtained by the matrix operation from the respective video signals of R, G and B is input into the differential amplifier 104 at the positive polar input end, is voltage-amplified and is input into the mixers 77, 87 and 97. The output voltage of the sample holding circuits 76, 86 and 96 and the average valve of the above mentioned luminance signal are superimposed on each other in the mixers 77, 87 and 97 and are fed respectively to the gain controlling inputs of the GCA's 74, 84 and 94.

On the other hand, the reference voltage source 105 is fed to the differential amplifier 104 at the negative polar input end. By a negative feedback loop formed of the solid state imaging device —GCA—mixer—differential amplifier—integrating circuit—matrix circuit, the output voltage of the integrating circuit 103 is controlled in the negative feedback so as to be equal to the reference voltage. Thereby, when the dispersion among R, G and B of the solid state imaging device and prism is corrested, the gains of the GCA's 74, 84 and 94 will be automatically controlled so that the video signals of the respective colors may be on a constant level.

Thus, according to this embodiment, the AGC function can be realized in a TV camera externally fitted to a three-plate type endoscope which has so far diffucult, particularly the dispresion of the spectral characteristic of an optical prism and the dispersion of the characteristic among a plurality of solid state imaging device can be corrected, the gain of a CGA can be controlled so that the video signals of the respective colors may be on a constant level and an AGC function high in the precision can be provided.

It is apparent that, in the present invention, working modes different in a wide range can be formed on the basis of the present invention without deviating from the spirit and scope of the invention. The present invention is not restricted by its specific working mode except being limited by the appended claims.

What is claimed is:

1. A three-plate type TV camera apparatus removably fitted to an endoscope eyepiece part for imaging an object image divided into three primary colors, comprising:
    a reference signal superimposing means superimposing a reference signal on respective divide color signals;
    an amplifying means amplifying each said divided color signal on which said reference signal is superimposed;
    a signal processing means processing each said amplified signal; and
    a gain controlling means controlling the relative gain of each said amplifying means in response to the difference between said reference signal component including in the output of each of said signal processing means and an objective reference level.

2. A three-plate type TV camera apparatus removably fitted to an endoscope eyepiece part for imaging an object image divide into three primary colors comprising:
    a reference signal superimposing means superimposing a reference signal on respective divided color signals;
    an amplifying means amplifying each said divided color signal on which said reference signal is superimposed;
    a signal processing means processing each said amplified signal; and
    a gain controlling means forming a negative feedback loop negatively feeding back the difference between said reference signal component included in the output of each of said signal processing means and a objective reference level and automatically correcting the relative gain of each said amplifying means with a negative feedback control.

3. A three-plate type TV camera apparatus according to claim 1 wherein said gain controlling means comprises:
    a reference signal component comparing means for comparing said reference signal components included in the outputs of said respective signal processing means and detecting the reference signal component difference between the respective signals;
    an output level detecting means detecting the average value of the output levels of said amplifying means; and
    a gain controlling signal producing means superimposing the detected average value and the reference signal level difference between said respective signals on each other and outputting the difference between this superimposed signal and a controlling target pontential as a gain controlling signal;
    wherein said gain controlling means a negative feedback loop negatively feeding back said gain controlling signal to said amplifying means and automatically correcting the gain of said amplifying means.

4. A three-plate type TV camera apparatus according to claim 1 wherein said gain controlling means comprises:
 a reference signal component holding means holding said reference signal components included in the outputs of said respective signal processing means; and
 an output level detecting means detecting the average value of the output levels of said signal processing means;
 wherein said gain controlling means forms a negative feedback loop superimposing said held reference signal component and the output level difference from said output level difference detecting means on each other, negatively feeding back the superimposed signal as a gain controlling signal to said amplifying means and automatically correcting the gain of said amplifying means.

5. A three-plate type TV camera apparatus according to claim 1,
 said reference signal superimposing means comprises a pilot signal generating means generating a pilot signal and a mixing means superimposing a pilot signal on respective color signals; and
 wherein said gain controlling means controlls the gain of said amplifying means on the basis of a level difference between the respective colors of the pilot signal.

6. A three-plate type TV camera apparatus according to claim 5,
 wherein said gain controlling means comprising a holding means holding the level of said pilot signal component and difference detecting means detecting the level difference between the respective colors of the signal; and forms a negative feedback loop negatively feeding back said level difference to said ampliying means.

7. A three-plate type TV camera apparatus according to claim 6,
 wherein said gain controlling means further comprises a luminance signal producing means producing the average value of the luminance signals from the respective color signals; and
 wherein said gain controlling means superimposes the output of said difference detecting means and the output of the luminance signal producing means on each other and negatively feedback the difference between this superimposed signal and a controlling target potential as a gain controlling signal.

8. A three-plate type TV camera apparatus according to claim 6 wherein said difference detecting means detects the level difference between the R and B signals with the level of the pilot signal component of the G signal as a reference.

9. A three-plate type TV camera apparatus according to claim 1,
 said reference signal superimposing means includes a white light superimposing means superimposing a white light signal on respective color signals; and
 wherein said gain controlling means controls the gain of said amplifying measn on the basis of a level difference in the respective colors of this white light signal.

10. A three-plate type TV camera apparatus according to claim 9 wherein said white light superimposing means includes a white light source emitting a white light into a region not influencing the observed image of an imaging means for recpective color signals.

11. A three-plate type TV camera apparatus according to claim 9,
 said gain controlling means comprises a holding means holding the level of said white light signal component; a luminance signal producing means producing the average value of the luminance signals from the respective color signals; and difference detecting means detecting the difference between the average value of these luminance signals and a controlling target pontential ; and
 wherein said gain controlling means forms a negative feedback loop superimposing the output of said holding means and the output of said difference detecting means on each other, negatively feeding them back to said respective amplifying means and correcting the level difference between the respective colors.

* * * * *